(12) United States Patent
Perras et al.

(10) Patent No.: US 11,985,549 B2
(45) Date of Patent: May 14, 2024

(54) DISTRIBUTED MOBILITY MANAGEMENT TECHNOLOGY IN A NETWORK ENVIRONMENT

(71) Applicant: InterDigital Patent Holdings, Inc., Wilmington, DE (US)

(72) Inventors: Michelle Perras, Montréal (CA); Alexander Reznik, Pennington, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 117 days.

(21) Appl. No.: 15/891,279

(22) Filed: Feb. 7, 2018

(65) Prior Publication Data
US 2018/0167850 A1 Jun. 14, 2018

Related U.S. Application Data

(63) Continuation of application No. 14/648,669, filed as application No. PCT/US2013/072485 on Nov. 29, 2013, now abandoned.
(Continued)

(51) Int. Cl.
*H04W 36/00* (2009.01)
*H04L 61/5007* (2022.01)
*H04W 8/14* (2009.01)

(52) U.S. Cl.
CPC ..... *H04W 36/0016* (2013.01); *H04L 61/5007* (2022.05); *H04W 8/14* (2013.01); *H04W 36/0011* (2013.01)

(58) Field of Classification Search
CPC .............. H04W 36/0016; H04W 8/14; H04W 36/0011; H04L 61/2007; H04L 61/5007
See application file for complete search history.

(56) References Cited

U.S. PATENT DOCUMENTS 7,248,572 B2 7/2007 Bender et al.
7,929,497 B1 4/2011 Alasti et al.
(Continued)

FOREIGN PATENT DOCUMENTS

EP 1534037 A1 5/2005
JP 2009-213070 A 9/2009
(Continued)

OTHER PUBLICATIONS

Bernardos et al., "Towards Flat and Distributed Mobility Management: a 3GPP Evolved Network Design", IEEE International Conference on Communications (ICC), Jun. 10, 2012, pp. 6855-6861.
(Continued)

*Primary Examiner* — Ian N Moore
*Assistant Examiner* — Latresa A McCallum
(74) *Attorney, Agent, or Firm* — Condo Roccia Koptiw LLP

(57) ABSTRACT

Embodiments contemplate that the transfer of an Internet Protocol (IP) address from one (e.g. a first) Gateway (GW) to another (e.g. a second) Gateway (GW) may improve the Dynamic Mobility Management (DMM) handling in any network environment, including a dense network environment. Embodiments contemplate a dense network may enable a User Equipment (UE or wireless transmit/receive unit (WTRU)) to be connected to the closest GW while the IP address transfer may enable the usage of a relatively short data path (e.g. perhaps a "shortest" data path), which may be useful in the context of DMM, perhaps even for existing flows. Using the contemplated capability of moving IP addresses may minimize the number of IP addresses allocated and/or the number of tunnels to be maintained.

12 Claims, 13 Drawing Sheets

Related U.S. Application Data

(60) Provisional application No. 61/732,161, filed on Nov. 30, 2012.

(56) References Cited

U.S. PATENT DOCUMENTS

| | | | |
|---|---|---|---|
| 2004/0073659 A1 | 4/2004 | Rajsic et al. | |
| 2004/0246933 A1* | 12/2004 | Valko | H04W 76/11 370/338 |
| 2005/0113107 A1 | 5/2005 | Meunier | |
| 2005/0203943 A1 | 9/2005 | Su et al. | |
| 2008/0008179 A1* | 1/2008 | Chen | H04L 61/2092 370/392 |
| 2008/0019319 A1 | 1/2008 | Bahini et al. | |
| 2008/0207168 A1* | 8/2008 | Forsberg | H04W 12/04 455/411 |
| 2009/0279452 A1* | 11/2009 | Akiyoshi | H04W 36/0011 370/254 |
| 2010/0027509 A1 | 2/2010 | Velev et al. | |
| 2010/0111040 A1 | 5/2010 | Perras | |
| 2010/0315992 A1* | 12/2010 | Turanyi | H04W 8/082 370/315 |
| 2011/0045844 A1 | 2/2011 | Muller et al. | |
| 2011/0170469 A1* | 7/2011 | Watfa | H04L 47/125 370/312 |
| 2011/0255511 A1* | 10/2011 | Ikeda | H04W 36/0016 370/331 |
| 2011/0286430 A1 | 11/2011 | Zembutsu et al. | |
| 2012/0110145 A1* | 5/2012 | Pinheiro | H04W 4/70 709/220 |
| 2012/0307715 A1 | 12/2012 | Maeda et al. | |
| 2013/0077528 A1* | 3/2013 | Visser | H04L 41/12 370/255 |
| 2013/0176943 A1* | 7/2013 | Chan | H04W 80/045 370/328 |
| 2013/0230021 A1* | 9/2013 | Zuniga | H04W 76/12 370/331 |
| 2013/0309991 A1* | 11/2013 | Shaw | H04W 76/36 455/404.1 |
| 2013/0321328 A1* | 12/2013 | Ahn | G06F 3/03549 345/174 |

FOREIGN PATENT DOCUMENTS

| | | | | |
|---|---|---|---|---|
| JP | 2010-506437 A | 2/2010 | | |
| JP | 2011-199732 A | 10/2011 | | |
| JP | 2012-507952 A | 3/2012 | | |
| WO | WO-2012167153 A1 * | 12/2012 | | H04W 60/00 |
| WO | WO-2013060488 A1 * | 5/2013 | | H04L 61/25 |

OTHER PUBLICATIONS

Giust et al., "A Network-Based Localized Mobility Solution for Distributed Mobility Management", IEEE, 14th International Symposium on Wireless Personal Multimedia Communications (WPMC), Oct. 3-7, 2011, 5 pages.

Gundavelli et al., "Proxy Mobile IPv6", Network Working Group, Request for Comments: 5213, Aug. 2008, 92 pages.

Izumikawa et al., "Distributed Localized Mobility Management Using Geographical Location Information", The Institute of Electronics, Information and Communication Engineers, IEICE Technical Report, vol. 102, No. 444, Nov. 2002, pp. 43-48 (English Abstract Included).

Kuntz et al., "A Summary of Distributed Mobility Management", MEXT Working Group, Aug. 11, 2011, 23 pages.

* cited by examiner

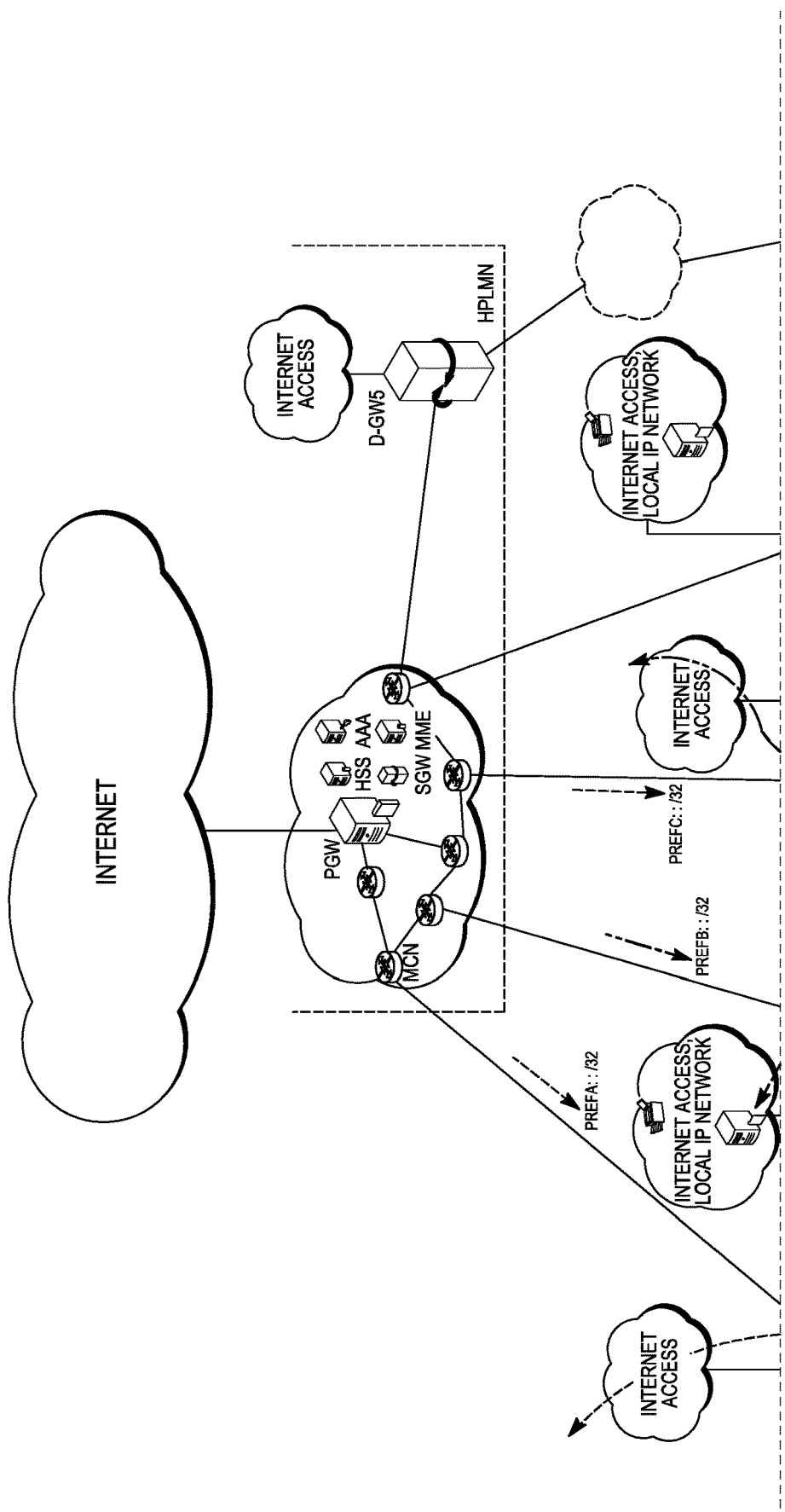

DISTRIBUTED MOBILITY MANAGEMENT TECHNOLOGY IN A NETWORK ENVIRONMENT

CROSS-REFERENCE TO RELATED APPLICATIONS

This application is a continuation application of U.S. patent application Ser. No. 14/648,669, filed May 29, 2015, which is the National Stage Entry under 35 U.S.C. § of Patent Cooperation Treaty Application No. PCT/US2013/072485, filed Nov. 29, 2013, which claims the benefit of U.S. Provisional Patent Application No. 61/732,161, titled "Distributed Mobility Management Technology In A Network Environment", filed Nov. 30, 2012, the entire contents of each of which being hereby incorporated by reference as if fully set-forth herein, for all purposes.

BACKGROUND

Embodiments recognize that Distributed Mobility Management (DMM) may support Internet Protocol (IP) mobility, network access, and routing which may allow for setting up IP networks so that traffic may be distributed in a way that may not rely on centrally stationed anchors to manage respective IP mobility sessions. Distributed mobility management techniques may support the maintenance of mobile hosts as devices and/or networks may change their point of attachment to the Internet.

SUMMARY

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments contemplate that the transfer of an Internet Protocol (IP) address from one (e.g., a first) Gateway (GW) to another (e.g. a second) Gateway (GW) may improve the Dynamic Mobility Management (DMM) handling in any network environment, including a dense network environment. For example, a dense network may enable a User Equipment (UE or wireless transmit/receive unit (WTRU)) to be connected to the closest GW while the IP address transfer may enable the usage of a relatively short data path (e.g. perhaps a "shortest" data path), which may be useful in the context of DMM, perhaps even for existing flows. Additionally, using the contemplated capability of moving IP addresses may minimize the number of IP addresses allocated and/or the number of tunnels to be maintained.

Embodiments contemplate a first node of a wireless communication network. The first node may comprise a processor. The processor may be configured to receive a handover from a wireless transmit/receive unit (WTRU). The processor may also be configured to determine that the WTRU was in connected communication with a second node of the wireless communication network prior to the handover. The processor may be configured to determine an Internet Protocol (IP) address that was allocated to the WTRU for the connected communication with the second node. The processor may be configured to request a transfer of the IP address from the second node. The processor may be configured to receive the IP address from the second node. The processor may be configured to establish connected communication with the WTRU using the IP address.

Embodiments contemplate a wireless transmit/receive unit (WTRU) that may be in communication with a wireless communication network. The WTRU may comprise a processor. The processor may be configured to connect to a first node of the wireless communication network. The processor may be configured to obtain a first Internet Protocol (IP) address from the first node. The processor may be configured to communicate via the first IP address as the WTRU may be connected to the first node. The processor may be configured to initiate a handover to a second node of the wireless communication network. The processor may be configured to connect to the second node. The processor may be configured to obtain a second IP address from the second node. The processor may be configured to communicate via the first IP address as the WTRU may be connected to the second node, perhaps upon an occurrence of a condition. The condition may include one or more characteristics of the first node and one or more characteristics of the second node.

Embodiments contemplate one or more techniques that may comprise receiving a handover at a first node of a wireless communication network from a wireless transmit/receive unit (WTRU). Techniques may comprise determining, by the first node, that the WTRU was in connected communication with a second node of the wireless communication network prior to the handover. Techniques may comprise determining, by the first node, an Internet Protocol (IP) address allocated to the WTRU for the connected communication with the second node. Techniques may comprise requesting, by the first node, a transfer of the IP address from the second node. Techniques may comprise receiving, at the first node, the IP address from the second node. Techniques may comprise establishing, by the first node, connected communication with the WTRU using the IP address.

BRIEF DESCRIPTION OF THE DRAWINGS

A more detailed understanding may be obtained from the following description, given by way of example in conjunction with the accompanying drawings wherein:

FIGS. 3A and 3B, which combine to form FIG. 3, illustrate an example DMM-Based Mobile Network (Network-Based (GTP and PMIPv6 variants)) model consistent with embodiments;

DETAILED DESCRIPTION OF ILLUSTRATIVE EMBODIMENTS

A detailed description of illustrative embodiments will now be described with reference to the various Figures. Although this description provides detailed examples of possible implementations, it should be noted that the details are intended to be examples and in no way limit the scope of the application. As used herein, the articles "a" and "an", absent further qualification or characterization, may be understood to mean "one or more" or "at least one", for example.

Figure 1A:
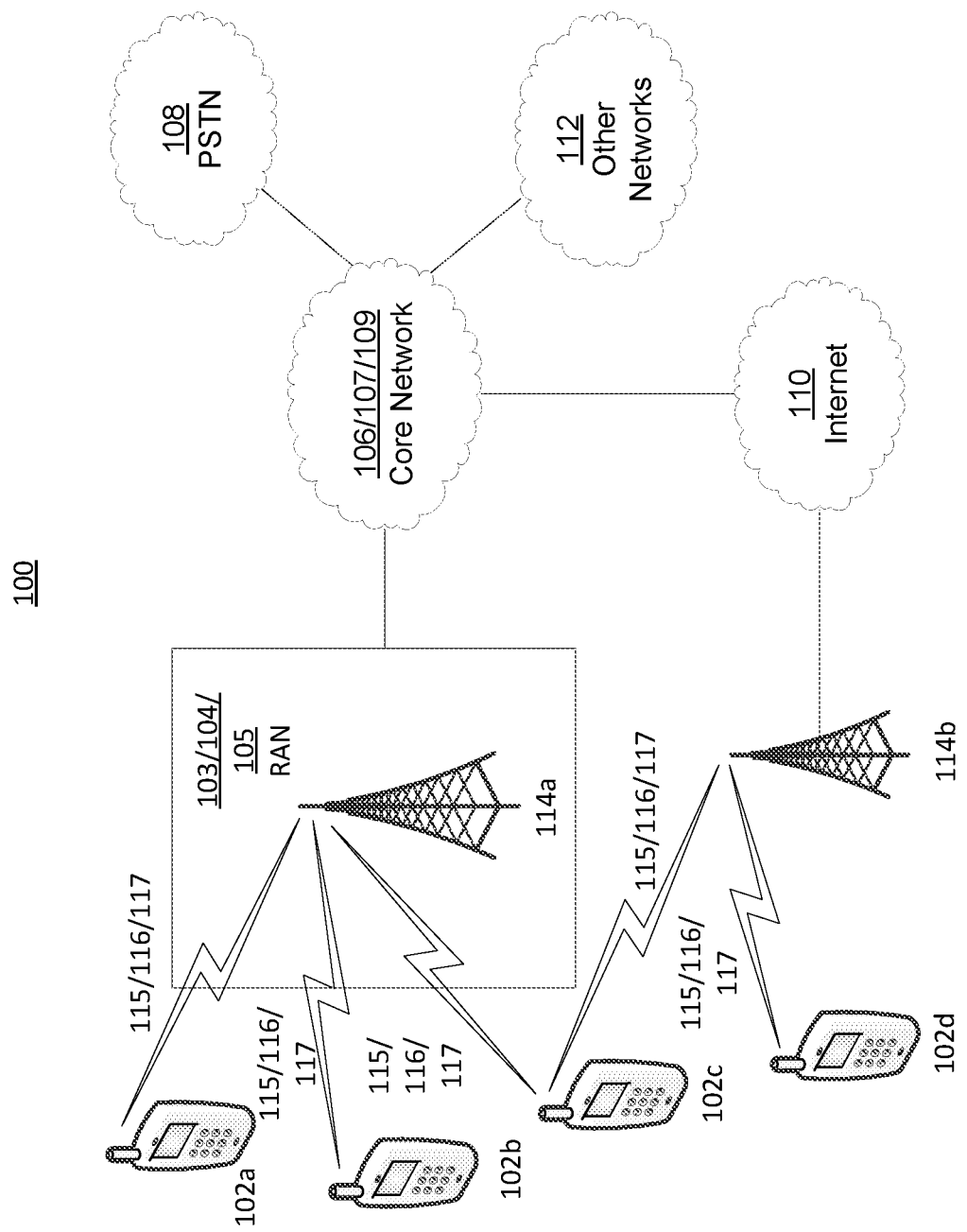
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

One or more or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
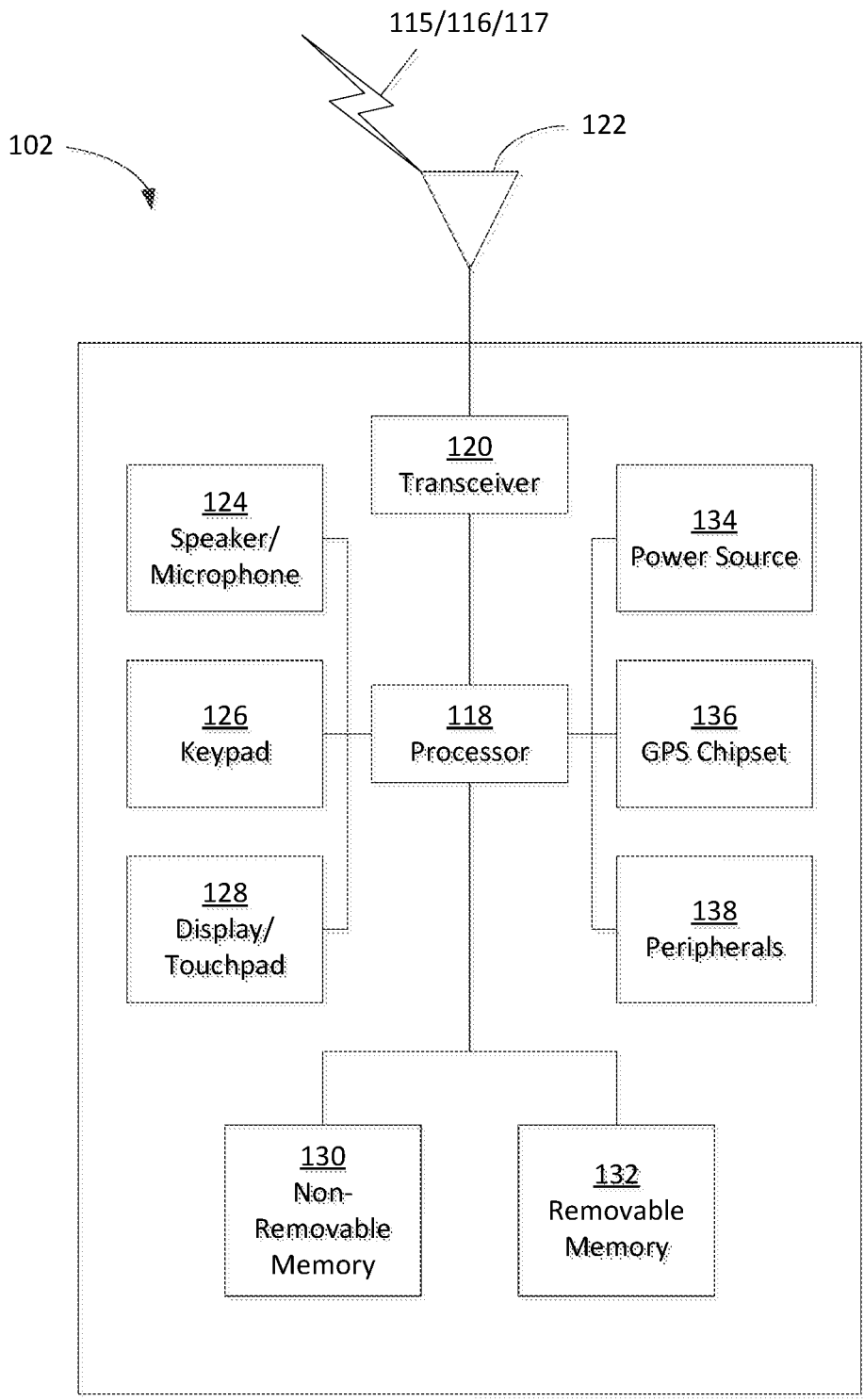
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include one or more or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
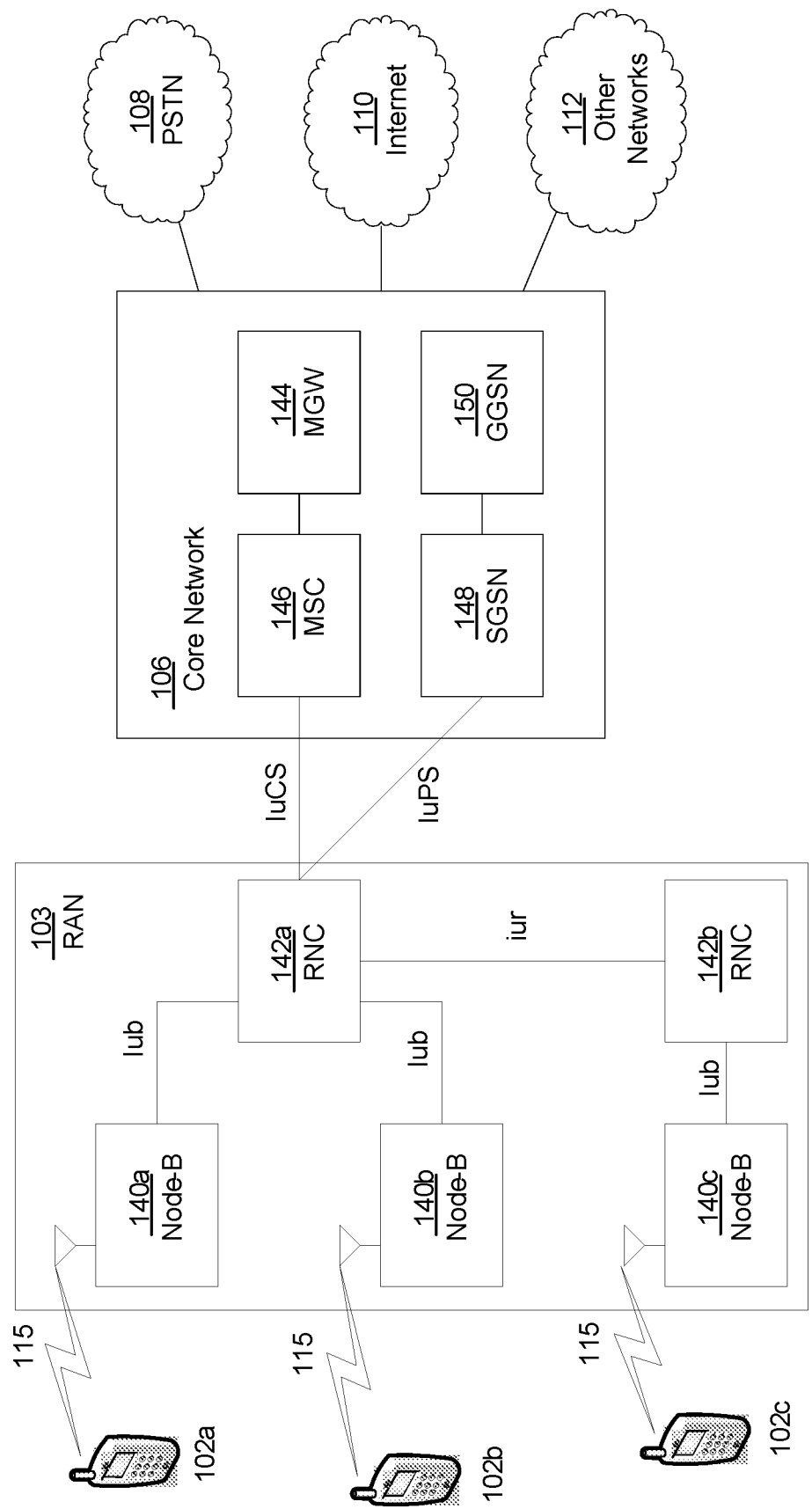
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
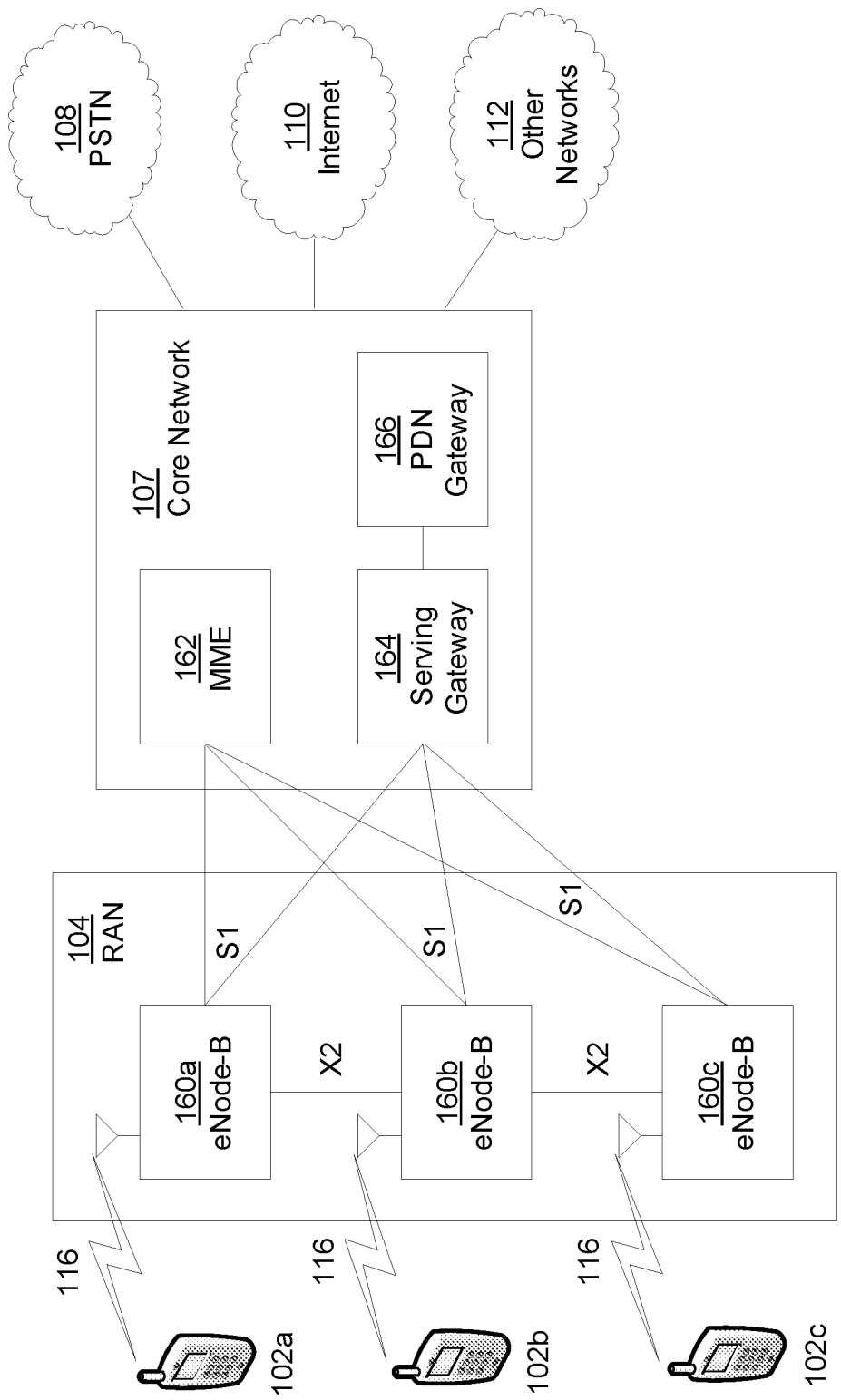
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
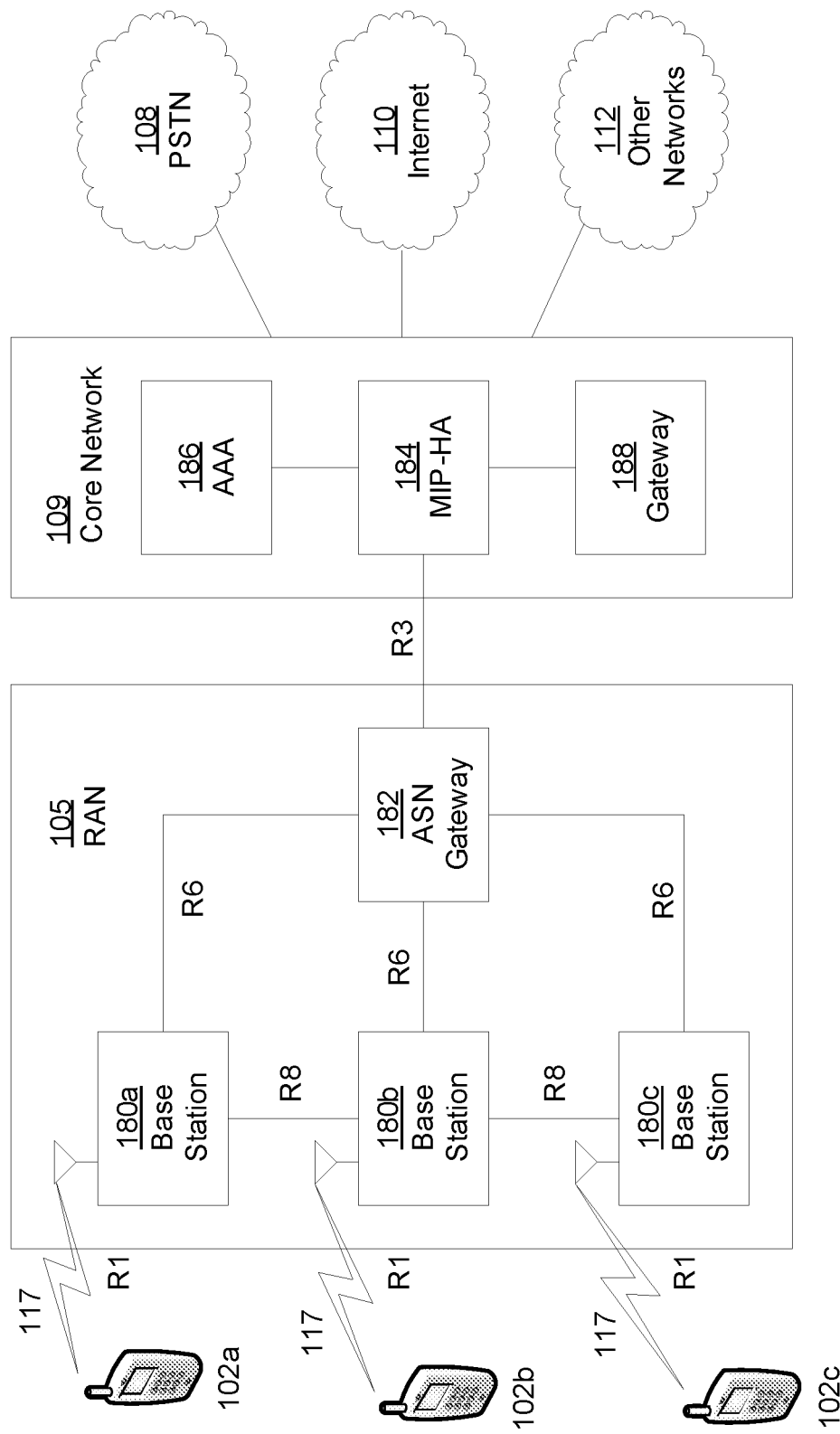
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Figures 2, 2A:
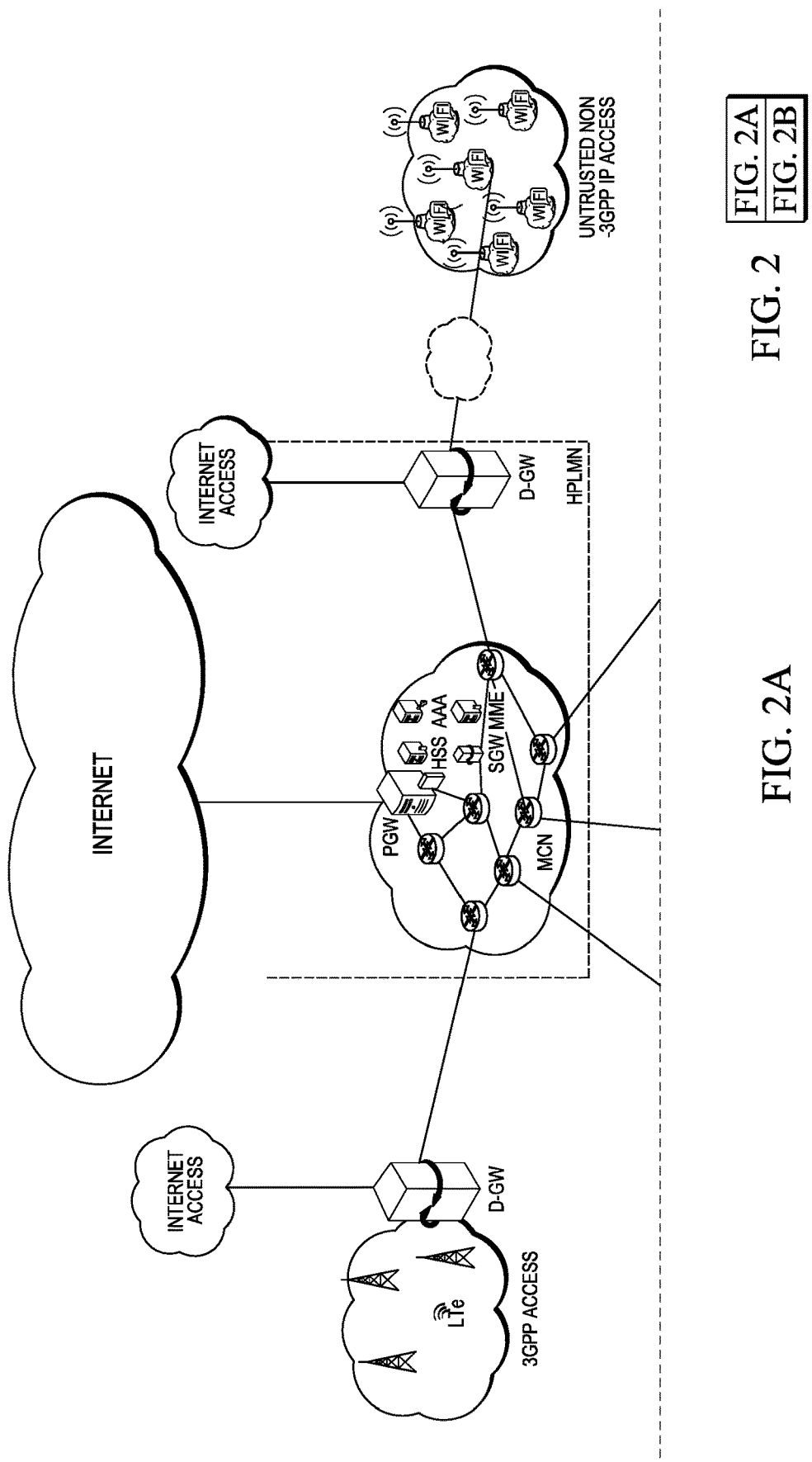
FIGS. 2A and 2B, which combine to form
FIG. 2, illustrate an example DMM-Based Mobile Network System Design global view consistent with embodiments.
Figure 2B:
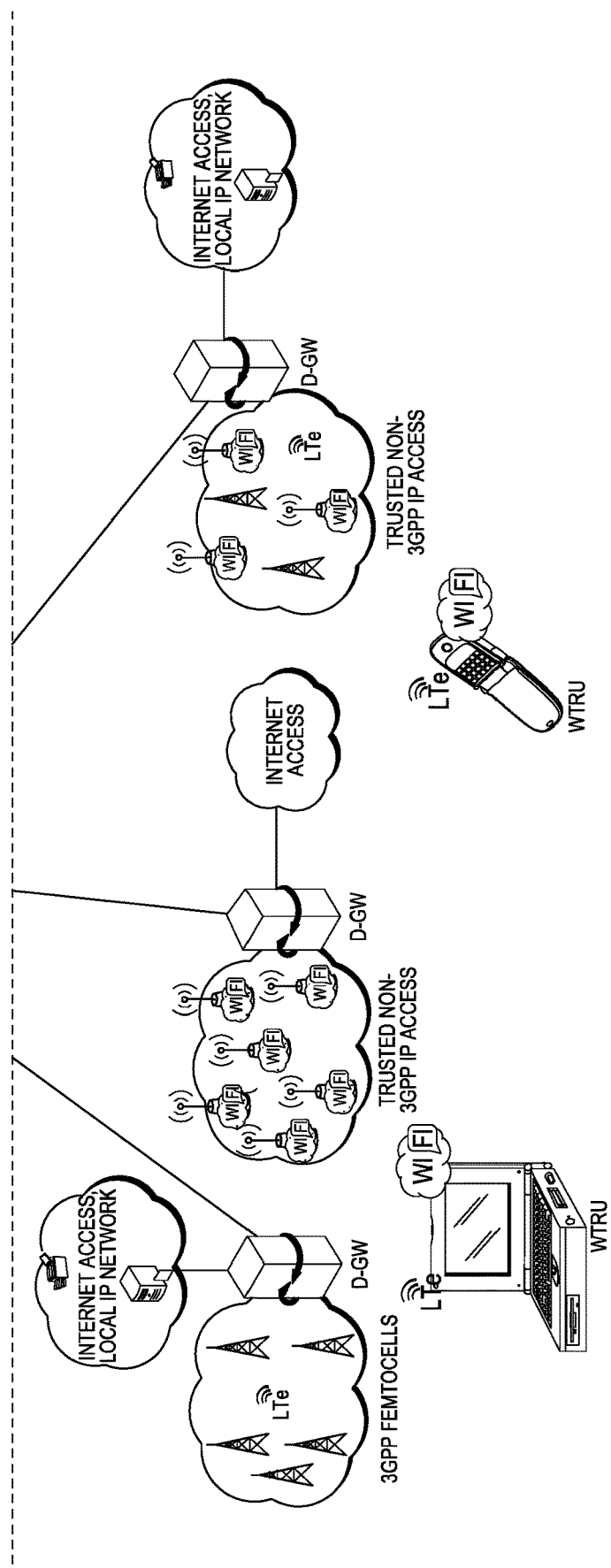

By way of explanation, and not by way of limitation, embodiments contemplate the following acronyms and associated descriptions:

D-GW (or DGW) Distributed Gateway
DMM Distributed Mobility Management
GTP GPRS Tunneling Protocol
GW Gateway
HO Handover
L-GW (or LGW) Local Gateway
LHN Local Home Network
LMA Local Mobility Anchor
MAG Media Access Gateway
MIP Mobile IP Protocol
PBA Proxy Binding Acknowledgment PBU Proxy Binding Update
PDN Packet Data Network
PGW PDN Gateway
PMIP Proxy MIP
UE User Equipment
WTRU Wireless Transmit/Receive Unit Embodiments contemplate that a Distributed Gateway (D-GW) may serve as an Anchor Node in DMM. DMM may push the anchor nodes to the edge of a network and may enable the usage of multiple anchor nodes. An example high level global view of the DMM-based network architecture is shown in FIGS. 2A and 2B, which combine to form FIG. 2. Embodiments contemplate that a logical network entity, called a "Distributed Gateway (D-GW)" (for purposes of explanation and not limitation), may be introduced at the edge of the network, perhaps close (or proximate) to the WTRU. In one or more embodiments, the D-GWs can be collocated with existing 3GPP nodes and/or deployed as standalone entities.

Figure 3B:
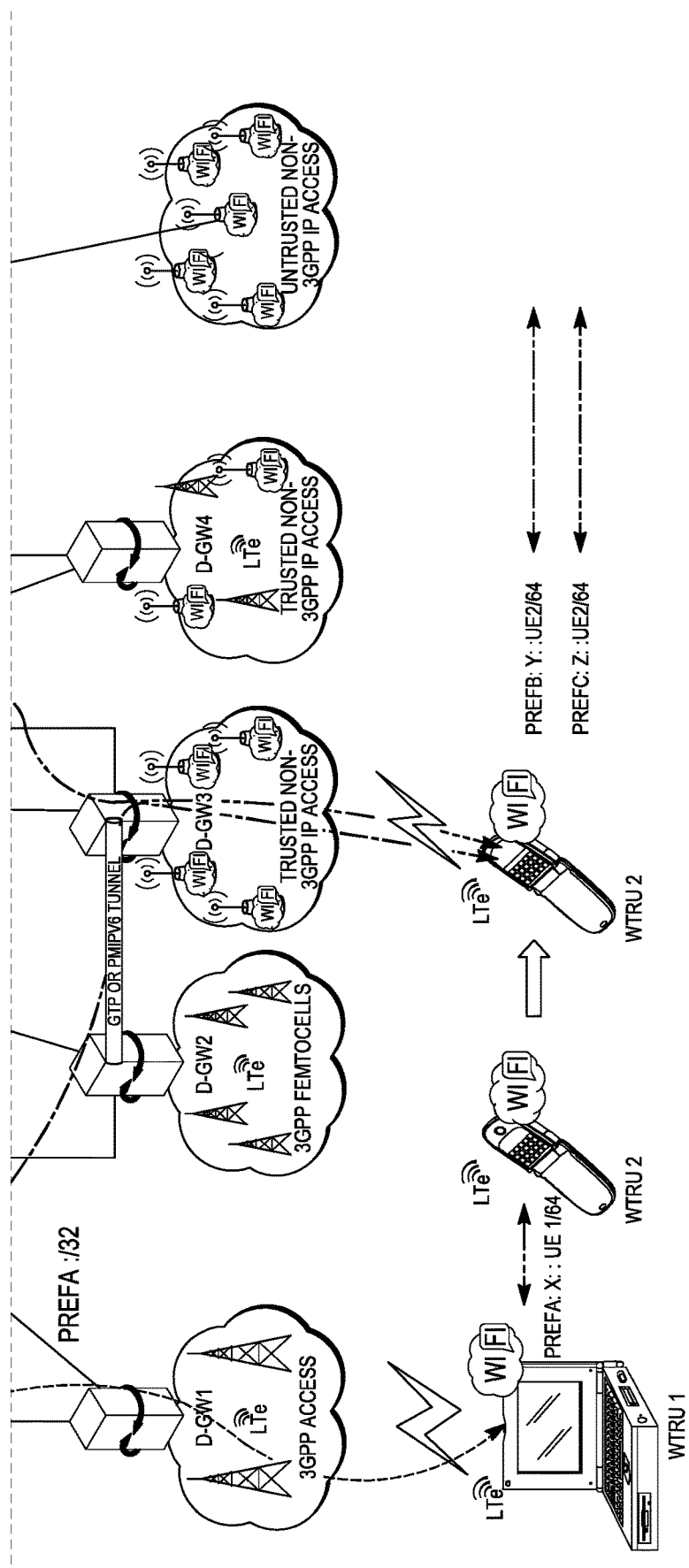

FIGS. 3A and 3B, which combine to form FIG. 3, illustrate an example network-based (e.g. GTP and PMIPv6 variants) implementation of DMM contemplated by one or more embodiments. In FIG. 3, the PDN connection requested by the WTRU may be handled by the D-GW. An IPv6 prefix from its pool may be assigned to the WTRU. This prefix may be conveyed to the WTRU so it can auto-configure an IPv6 address. The WTRU can then start sending and/or receiving IPv6 packets, which may be routed via the D-GW, perhaps without traversing the mobile core network (MCN).

In some embodiments, at least one of two techniques may be implemented, for example perhaps if the WTRU moves and/or attaches to another access network, among other reasons. In some embodiments, the packet data network (PDN) connections that the WTRU may have established may be maintained, for example, address preservation, (and in some embodiments, perhaps may need to be maintained). This may involve, perhaps for one or more, or each, of the PDN connections of the WTRU, that the D-GW anchoring the IP address used by the WTRU play the role of a PDN Gateway (PGW) (e.g., LMA) for that PDN connection. For example, the D-GW may assume the performance of the LMA functions for that WTRU and/or that PDN connection. In some embodiments, the D-GW to which the WTRU is attached may play (and in some embodiments, perhaps must play), for one or more, or each, of the PDN connections of the WTRU anchored at other D-GWs, the role of MAG (e.g., creating a GTP/PMIPv6 tunnel toward each LMA).

In some embodiments, the WTRU may request a new (e.g. fresh) PDN connection (or several fresh connections) to the D-GW to which the WTRU is currently attached. This may provide the WTRU with an IPv6 address anchored at the serving D-GW, which can be used by the WTRU to utilize an optimal or relatively optimal routing, perhaps while making better use or the relatively best use of the operator's network resources.

In some embodiments, one or more useful aspects that may be provided by a DMM approach may be enabled by WTRU smart IP address management. One or more embodiments contemplate that the IP address selection mechanisms that may be used by the WTRU may be enhanced to allow the WTRU to prefer (or in some embodiments, perhaps always prefer) an IPv6 address anchored at the D-GW to which the WTRU is currently attached. In this way, new (e.g. fresh) communications may make use of the locally anchored IPv6 addresses, while older communications may be maintained (e.g. perhaps seamlessly maintained) by ensuring IPv6 address continuity, for example.

Embodiments contemplate one or more DMM-Enabled Architecture Models. Embodiments contemplate some of the architecture models in the context of dense networks.

Figure 4:
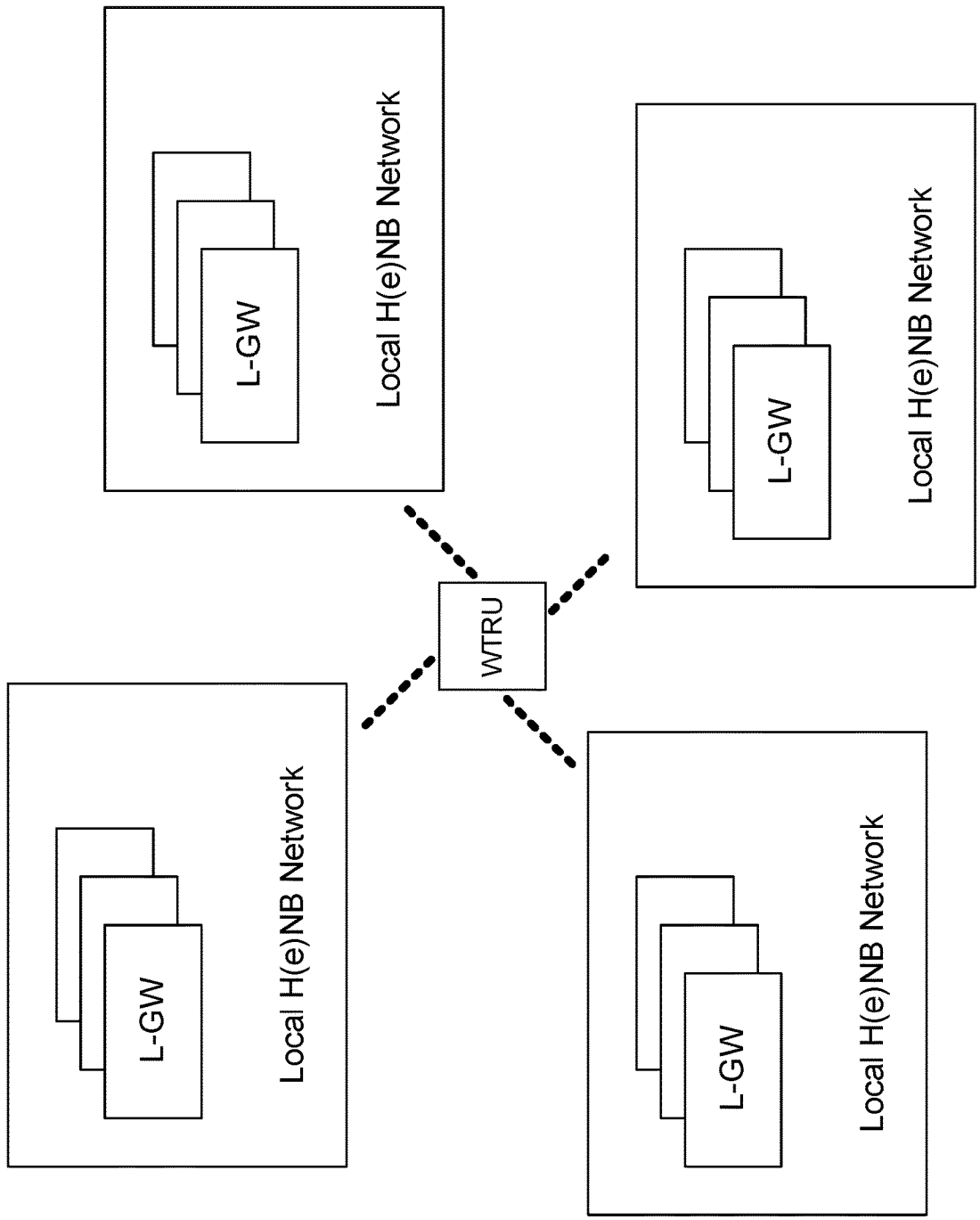
FIG. 4 illustrates an example local Gateway (L-GW) Evolved to DMM in a Dense Network model consistent with embodiments.

One or more embodiments contemplate an L-GW in a Dense Network. For example, in a dense network, the WTRU may have access to one or more, or many, L-GWs from within the same LHN and/or different LHNs and/or may connect to the same or different PDNs. An example of such an embodiment is illustrated in FIG. 4.

Figure 5:
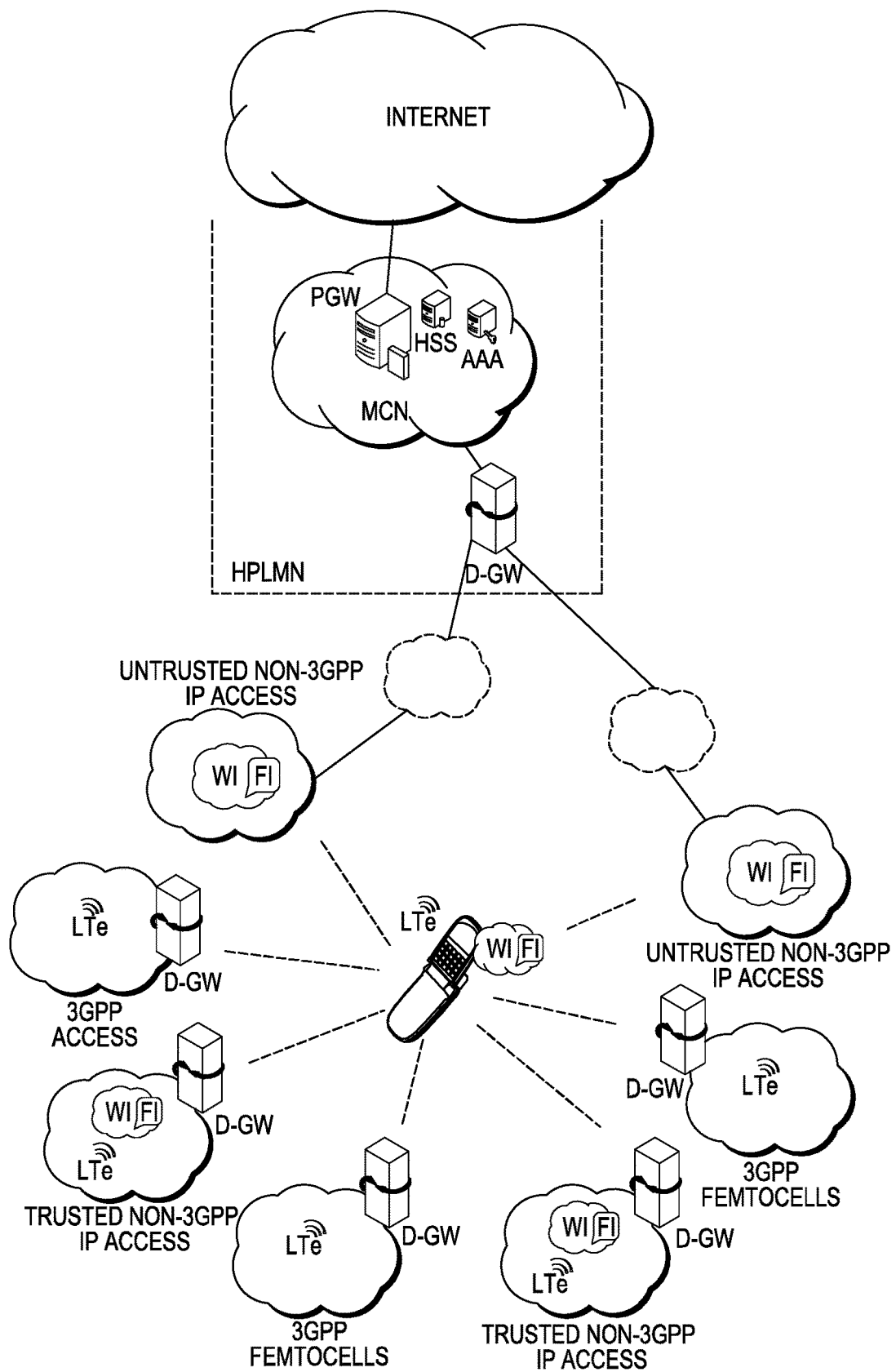
FIG. 5 illustrates an example distributed Gateway (D-GW) in a Dense Network model consistent with embodiments.

One or more embodiments contemplate a D-GW (or DGW) in a Dense Network. In DMM, the Distributed Gateway (D-GW) may be the anchor node and the WTRU may connect to another D-GW (e.g., anchor node) when going to another access GW implementing DMM, perhaps while maintaining session connectivity. In a dense network for example, the WTRU may have access to one or more, or many, D-GWs using the same or different technologies/interfaces. An example of such an embodiment is illustrated in FIG. 5.

Embodiments contemplate Node Distance Evaluation. One or more embodiments contemplate a WTRU's capability to evaluate the distance between itself and the anchor nodes it may communicate with (or "see"). The distance between the WTRU and the anchor nodes may be evaluated, for example, by allowing the sending of a geo-location of the anchor node to the WTRU. In some embodiments, the WTRU may be expected to know its own geo-location using, for example, an internal GPS. One or more calculations may be done by the WTRU to determine which anchor nodes may be within a distance range or ranges. In some embodiments, distance ranges may also be configured so that anchor nodes within the same range may be considered at an equal distance, for example.

Embodiments contemplate that it may be useful for signaling to be reduced and/or limited in the core network. With the densification of the networks, limited signaling may be more useful since this densification may result in more handovers, which may result in more signaling. Embodiments recognize that using DMM techniques may increase such signaling since the number of tunnels, perhaps created to maintain session continuity, may increase with the number of anchor nodes, for example.

Embodiments contemplate that a dense network may, for example, be described as a network which may have multiple anchor nodes that may be close to each other (or in some embodiments, perhaps very close to each other). In some embodiments, "close" to each other may be indicated by the anchor nodes being geographically located close to each other, (e.g. at a walking distance) and/or that at the routing level, few intermediate routers may exist between the anchor nodes (e.g. any two anchor nodes). In some embodiments, "very close" may be indicated by their being few or no intermediate routers located between the anchor nodes (e.g. any two anchor nodes). In a dense network, there may be a number of (or perhaps many) potential connections and a WTRU may be frequently (or in some embodiments, perhaps constantly) discovering anchor nodes that may be accessible. Embodiments contemplate that this potential multitude of available anchor nodes may provide opportunities for mobility and/or bandwidth management. Embodiments also recognize that the number of potential connections may lead to some challenges, for example: frequent handovers may be supported (or in some embodiments, perhaps may need to be supported), and/or a number of tunnels may end-up being created and/or may be maintained (or in some embodiments, perhaps may need to be maintained), among other challenges.

Embodiments recognize that the usage of tunnels may enable session continuity. Embodiments also recognize that tunnel creation/maintenance may generate additional control plane traffic and/or the tunneling may make the data path non-optimal. Also, the user experience may degrade because of the extra handling of handovers, for example. Embodiments contemplate that, perhaps in consideration of the dense network architecture and/or based on existing DMM techniques (among other rationale), among other scenarios, improvements (as described herein) in the network and/or on the WTRU may be useful to perhaps avoid the aforementioned negative conditions and other contemplated negative conditions, for example.

Embodiments contemplate one or more techniques that may make DMM technologies sufficiently efficient to be used in a dense network environment. One or more embodiments contemplate one or more techniques to minimize the number of tunnels in a DMM-enabled network, such as for example a dense network. By way of further example, one or more embodiments contemplate that the number of tunnels may be minimized by bundling connections together. Also by way of example, one or more embodiments contemplate that the number of tunnels may be minimized by moving the IP address to another anchor.

Embodiments contemplate connections bundling. One or more embodiments contemplate that a WTRU that may be evolving in a dense network may do one or more, or multiple, handovers (HOs) to DGWs that may be close to each other (e.g. relatively close or very close). The WTRU may obtain an IP address from one or more, or each, of these DGWs (D-GWs). One or more, or each, time the WTRU may do a HO to another DGW, an additional tunnel may be created (or in some embodiments, perhaps may need to be created) to maintain the session continuity of flows using the corresponding IP addresses. The WTRU may bundle a number of connections, or many connections, together and/or select an IP address to be used over these connections (e.g., perhaps a single IP address), perhaps to minimize the number of tunnels, among other reasons.

Embodiments contemplate that the WTRU may be connected to a GW for a certain amount of time. In such scenarios, among others, perhaps even if an IP address obtained from a GW within the same bundling may be used, the IP address from the currently connected GW may be made available for new (e.g., fresh) flows. Embodiments contemplate that the WTRU's source IP address selection may be enhanced, perhaps to support such behaviors, among other reasons.

Embodiments contemplate that bundling the connections together may enable the creation of fewer tunnels, for example when the WTRU may move to another DGW, among other scenarios. In some embodiments, an IP address allocated from a DGW might not be used. For example, no associated flow may be released when the direct connection to the DGW may be lost/terminated. Thus, no tunnel may be created (or perhaps might not need to be created) to maintain session continuity with such DGWs. For example, if five connections are bundled together, at least one IP address among the five allocated IP addresses may be used by the WTRU (or perhaps in some embodiments, perhaps only one IP address may be used). A tunnel may be created (or in some embodiments, perhaps only one tunnel may be created), for example if the WTRU does a HO to another DGW (e.g., a tunnel toward the DGW which may have allocated the IP address in use by the WTRU), among other scenarios.

One or more embodiments contemplate that the bundling may be done intelligently, e.g., with a small number of connections to perhaps avoid having an unacceptable data path length but with enough connections to sufficiently minimize the number of tunnels. The number of connections to be bundled may be configurable and/or may also be correlated to the distance between the DGWs, for example. The anchor node distance evaluation described herein may be used to evaluate the distance between the DGWs.

In one or more embodiments, the bundling may be done on or by the WTRU. Alternatively or additionally, the network may be involved in the bundling, for example if a group technique may be used. By way of example, the network provider may assign group numbers to one or more, or each, anchor node. In such scenarios, among others, the WTRU may use the group ID to do the bundling, for example.

In some embodiments, the anchor nodes might or might not be involved and/or be aware of the respective bundling associations. In some embodiments, the respective anchor nodes might or might not be aware that they are bundled with other anchor nodes, for example.

In one or more embodiments, on the WTRU, the bundling may be logical. In some embodiments, the HO to another anchor node may be done and/or a new (e.g. new to the WTRU) IP address may be obtained by the WTRU. On the WTRU, the logical bundling may, for example, hide the newly obtained IP address from one or more applications. Alternatively or additionally, the newly obtained IP address may be flagged as deprecated (e.g. not to be used). In some embodiments, the decision to bundle the newly connected anchor node and/or IP address to the currently used one may be done on the WTRU, perhaps transparently to the network, for example. One or more embodiments contemplate that the decision on the WTRU may be based on the anchor node(s)' location, among other criteria.

Figure 6:
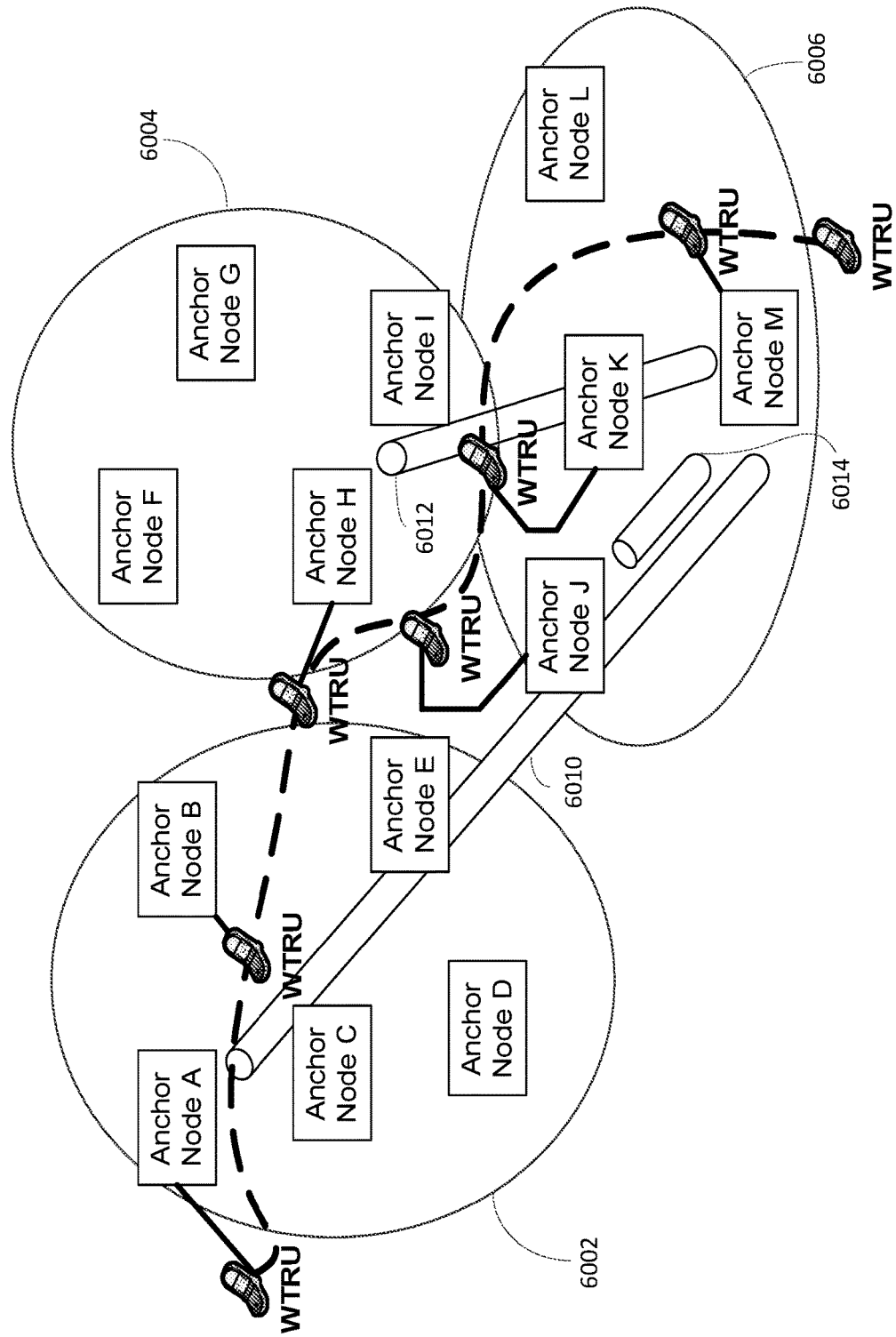
FIG. 6 illustrates an example node selection from which Internet Protocol (IP) addresses may be obtained in a connection bundling environment, consistent with embodiments.

For example, referring to FIG. 6, once an IP address (e.g. IPa, not shown) may be obtained from an anchor node (e.g., Anchor Node A, or simply, Node A), flows may start to use this IP address (IPa, not shown). In some embodiments, the WTRU may perform one or more handovers (HOs) to other anchor nodes. In some embodiments, the WTRU may decide to not use the IP addresses that may be allocated from these other anchor nodes if they are located at, for example, less than 500 feet (among other contemplate lengths) from the anchor node which may have allocated the currently used IP address (IPa). For example, the WTRU may be configured to determine that Node B is sufficiently close to Node A as to include both Node A and Node B into the same logical bundling 6002. Thus, the WTRU might not use an IP address obtainable from Node B (e.g., IPb, not shown).

Again by way of example, on the WTRU, the bundling may be based on the distance between the anchor node from which the IP address may be used and the other anchor nodes (e.g., determined dynamically by the WTRU). If the distance may be determined to be too large (e.g. as compared to a predetermined threshold, or other criteria), then the newly allocated IP address may be elected as the IP address to be used for new (e.g. fresh) flows and/or the previously used IP address may be set as deprecated. For the subsequent IP addresses that may be obtained from the other anchor nodes, the respective corresponding anchor node location may be compared with the anchor node from which the currently elected IP address (e.g., the currently used IP address) may have been obtained. In some embodiments, connections bundling may be enabled by assigning (e.g., by the WTRU and/or a network entity, or the like) one or more, or each, node (or node connection) to a specific group (e.g., a logical group), or to multiple groups (e.g., one or more logical groups). In some embodiments, the group assignments may be done dynamically or may be predetermined. In some embodiments, for the subsequent IP addresses that may be obtained from the other anchor nodes, the respective corresponding anchor node logical group (e.g., group identifier) may be compared with the logical group (e.g., group identifier) of the anchor node from which the currently elected IP address (e.g., the currently used IP address) may have been obtained.

One or more embodiments contemplate that the WTRU may be configured to HO between GWs of the same group. The WTRU may connect to a first GW of a specific group. In some embodiments, the WTRU may be configured to use the obtained IP address from this GW. In some embodiments, the WTRU may move to another (e.g., a second) GW that may be part of the same group. In some embodiments, the IP address that may be obtained from this second GW might not be used. The first IP address may still be selected for the one or more new (e.g., fresh) flows that may be started. The WTRU may move to another (e.g. a third) GW, that may be part of a second group (e.g., a different group than the first and the second GWs). In some embodiments, at least one tunnel (e.g. to the first GW) may be created (or perhaps in some scenarios, only one tunnel may be created and/or useful), perhaps to maintain session continuity, among other reasons.

For example, referring to FIG. 6, as the WTRU hands over from Node A to Node B, where both may be part of bundling 6002, the WTRU may continue to use IPa while in connection with Node B. As the WTRU connects to Node M of bundling 6006, the WTRU may use IPm (not shown) and/or may continue to use IPa. A tunnel 6010 may be established between Node A and Node M to forward one or more data flows that may be directed to IPa towards the WTRU.

By way of further example, IPa may still be in use by an application running on the WTRU. The tunnel 6010 between Anchor Node M and Anchor Node A may be used to transport the IP packets which use IPa. For example, one or more downlink packets that may be sent from a correspondent node (not shown) toward the WTRU may be received at Anchor Node A (e.g., IPa owner). Anchor Node A may tunnel (e.g., via tunnel 6010) the one or more packets toward currently connected Anchor Node M. Anchor Node M may forward the one or more packets to the WTRU. For example, in the uplink direction, one or more IP packets from the WTRU that may use IPa may be sent to directly connected Anchor Node M, which may tunnel them (e.g., via tunnel 6010) to Anchor Node A. Anchor Node A may forward the one or more uplink IP packets to the correspondent node. Also by way of example, tunnel 6012 and/or tunnel 6014 which may respectively connect Anchor Node H with Anchor Node M and Anchor Node J with Anchor Node M, may be used in a manner similar to that described regarding tunnel 6010 (e.g., with regard to packets using IPh and/or IPj). In some embodiments, the tunnels 6010, 6012, and/or 6014 may be closed when it might not be useful for any applications/flows to use the corresponding IP address (e.g. tunnel 6012 may be closed if no more applications may be using IPh).

In some embodiments, no tunnels toward Anchor Nodes B and/or K (for example) may be useful, perhaps since the IP addresses IPb and/or IPk (not shown), which may have been obtained respectively from Anchor Nodes B and/or K, might not have been used by the WTRU, among other reasons. In other words, as IP addresses IPb and/or IPk might not be used by any application/flow running on the WTRU, session continuity as maintained via tunneling to Nodes B and/or K might not be useful and such tunnels might not be created. One or more embodiments contemplate that bundling may reduce a number of tunnels to be maintained, for example where the WTRU may be doing many HOs, among other scenarios.

FIG. 6 also shows an example node selection from which IP addresses may be obtained by the WTRU in an example connections bundling environment. In FIG. 6, by way of example illustration and not limitation, the WTRU may have traversed the path indicated to connect to Anchor Node M, where it may remain for a relatively long period of time. The different oval patterns associated with the anchor nodes may respectively represent different bundlings 6002, 6004, and 6006. In some embodiments, the WTRU may connect to Anchor Node A in bundling 6002 and/or may obtain IP address IPa. When a HO to Anchor Node B may be done, another IP address may be obtained, IPb. In some embodiments, IPb might not be used by the WTRU, for example since Anchor Node B may be bundled with Anchor Node A in bundling 6002 (e.g., IPb may be flagged as deprecated and/or logically hidden from one or more WTRU applications). The WTRU may perform many other HOs, e.g., to Anchor Node H (in bundling 6004), Anchor Node J (in bundling 6006), and/or, Anchor Node K, and the WTRU may go to Anchor Node M where it may stay connected for a period of time (e.g. a relatively long period of time). The IP addresses that the WTRU may use are IPa, IPh, IPj and/or IPm (none of which are shown). These IP addresses may be the first of the IP addresses obtained from the respective connections bundlings 6002, 6004, and/or 6006, perhaps with the exception of IPm which may be used because the WTRU may be connected to this Anchor Node M for a period of time (e.g. a relatively long time). Using IPm may provide a relatively optimum (e.g. "best") data path (e.g. no tunneling).

Embodiments contemplate IP Address Management. As described herein, the WTRU may connect to different anchor nodes supporting DMM. In some embodiments, the WTRU may end-up having multiple flows anchored with different gateways. The WTRU may obtain an IP address from one or more, or each, anchor node where it may connect. Session continuity may be obtained by creating one or more tunnels between the one or more anchor nodes that may have assigned an IP address to the WTRU (perhaps to which the WTRU might not be connected anymore) and the anchor node where the WTRU may be currently connected.

Embodiments contemplate one or more techniques of handling DMM, which may be useful in a dense network, perhaps because of the number of potential connections and resulting HOs and/or tunnels, among other reasons. One or more embodiments contemplate the capability to transfer an IP address handling (e.g., ownership) from one anchor node to another.

Embodiments contemplate transferring an IP address. Transferring an IP address used by a WTRU that may be moving to another anchor node may be useful. Embodiments contemplate that it may make it possible to use a relatively short (e.g. "shortest") data path to the WTRU, perhaps in some embodiments since no tunneling may be required between the previous anchor node and the current one, among other reasons. Embodiments may provide a better quality of service (QoS) to applications and/or quality of experience (QoE) to users. Embodiments may make it more efficient for the anchor nodes and/or the WTRU, perhaps since the more HOs the WTRU may perform with the current DMM support, the more tunnels may be created and/or the more IP addresses may be allocated. Embodiments recognize that maintaining these tunnels may consume resources on the anchor nodes and/or the WTRU, such as, for example, memory, CPU, etc. Embodiments may also reduce the signaling that may be needed to maintain the tunnels (e.g. keep such tunnels alive).

Embodiments contemplate one or more enhanced tunneling protocols/techniques that may be used to transfer an IP address. For example, using PMIPv6 as the tunneling protocol in a network-based solution to describe the IP address transfer, the Proxy Binding Update (PBU) may be modified to specify that an IP address (e.g., perhaps a specific IP address) may be required to be moved. In such scenarios, among others, the tunnel may be created and the GW receiving the PBU may reply with a Proxy Binding Acknowledgment (PBA). A PBA may be sent back acknowledging the request, for example perhaps if the GW may support the IP address transfer and/or may agree to move the IP address, among other scenarios. Alternatively or additionally, perhaps if the GW doesn't support the IP transfer, among other scenarios, a PBA may be still be sent back, for example acknowledging the creation of the tunnel. In some embodiments the PBA may specify with a return code (which may be heretofore undefined for such a purpose) that the IP address remains attached with the actual GW. This may enable the mix of GWs supporting and/or not supporting this IP transfer capability.

Embodiments contemplate that using modified PBU/PBA messages might not increase the signaling since PBU/PBA messages may be exchanged in DMM presently. One or more embodiments contemplate that messages may be used and/or introduced to implement the IP address transfer, perhaps where such messages may be useful.

One or more embodiments contemplate that a tunnel between two GWs may be created for a period of time (e.g. perhaps a short period of time) to allow the routing of IP packets that may be in-transit to reach the WTRU. The tunnel may be used (or perhaps in some embodiments may only be used) in the downlink direction. Packets using the transferred IP address and/or received by the source GW may then be sent to the WTRU via the tunnel to the target GW. The uplink packets from the WTRU may be received at the target GW and/or directly forwarded to the Internet, perhaps in some embodiments without going through the tunnel and/or source GW. In some embodiments the tunnel may be closed, perhaps after a period of time (e.g. a short period of time) that may allow the routing in the network to adapt to the new routing instructions (e.g. going to the target GW), among other scenarios.

Embodiments contemplate that a GW which may receive a request to transfer an IP address and/or which may accept the transfer may stop advertising this IP address as its own IP address (in other words, may stop acting as a proxy for the WTRU). In some embodiments, the GW where the WTRU may be connected and/or which may have requested the transfer of the IP address may start acting as a proxy for the WTRU and/or may start advertising this IP address as its own IP. An example of such an IP transfer technique is illustrated in FIG. 7.

Figure 7:
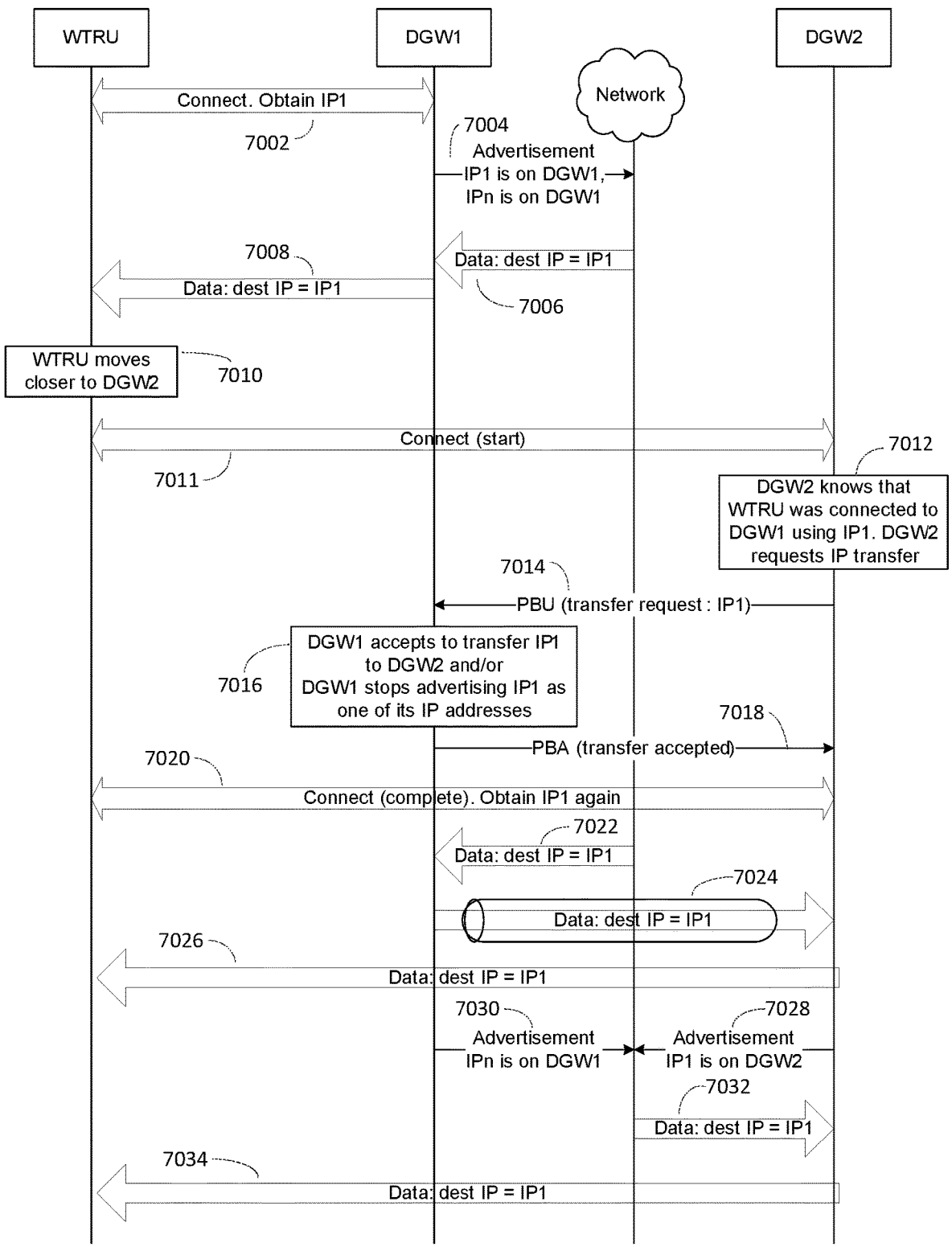
FIG. 7 illustrates an example Internet Protocol (IP) address transfer technique, consistent with embodiments.

Referring to FIG. 7, at 7002, the WTRU may connect to DGW1. The WTRU may obtain the IP address IP1. At 7004, the DGW1 may advertise that it is handling IP packets destined to IP1, for example so that, at 7006, one or more, or all, IP traffic with destination IP address set to IP1 may be directed to DGW1, among other reasons. At 7008, DGW1 may forward the IP packets to the WTRU.

At 7011, the WTRU may do a HO to DGW2, e.g. because at 7010, DGW2 may be closer than DGW1. At 7012, DGW2, perhaps because it is DMM capable, may have a way to know that the WTRU was previously connected to DGW1 and/or that IP1 may have been allocated to the WTRU. At 7014, DGW2 may request the IP1 transfer from DGW1. For example, this may be done through the sending of an enhanced (e.g., modified) PBU. At 7016, DGW1 may accept to transfer IP1 to DGW2. In some embodiments, DGW1 may stop advertising IP1 as one of its IP addresses. At 7018, an enhanced (e.g., modified) PBA may be sent to accept the transfer and/or to create a tunnel between the two DGWs. At 7020, DGW2 may assign IP1 to the WTRU.

In some embodiments, IP1 might not be flagged (e.g. flagged as deprecating IP1). One or both of the DGWs may do an update, in some embodiments perhaps depending on the DMM technique that may be used to keep track of the current WTRU connections and/or the assigned IP addresses. In some embodiments, perhaps because of the IP address transfer (e.g. if the Home Subscriber Server (HSS) may be used as a database), among other reasons, it may be useful for the database to be updated with a new (e.g., different) owner of the transferred IP address. It may be useful for pre-registrations to be updated, for example in scenarios in which pre-registrations with neighbors may be used, among other scenarios.

In one or more embodiments, at 7022, one or more IP packets may already be in transit to DGW1 during the IP address transfer. At 7024, the tunnel may be created and/or may be useful, perhaps even temporarily, between the two DGWs, for example for such already in-transit IP packets, among other reasons. The IP packets that reach DGW1 may be tunneled to DGW2 which, at 7026, may forward them to the WTRU.

The tunnel between DGW1 and DGW2 may be used for packets that may be in-transit, e.g. packets that have been sent with the next hop set to DGW1. Perhaps once the routing tables in the network are updated with the new next hop information (e.g. DGW2 may be the node handling IP1), the IP packets that may be using the IP1 destination IP address may be routed directly to DGW2. In such scenarios, the PMIP tunnel between DGW1 and DGW2 for IP1 handling might then not be useful anymore. For example, in some embodiments, a timer may be started by DGW2, perhaps once DGW2 starts to advertise IP1 as its own IP address and/or once DGW2 may start receiving IP packets using IP1. The tunnel may be closed, for example when the timer expires, among other reasons.

At 7028, DGW2 may start advertising that it is handling IP packets directed and/or destined to IP1. At 7030, DGW1 may stop advertising IP1. For example, DGW1 may advertise a different IP address (e.g. IPn). At 7032, IP packets destined to IP1 may be routed to the DGW2, which, at 7034, may forward them to the WTRU. The tunnel between DGW1 and DGW2, which may have been setup to tunnel packets using IP1, may be terminated (not shown). Even though PMIPv6 has been used to illustrate the example IP address transfer, any mobility protocol in a network-based solution (e.g. GTP) and/or in a client-based solution (e.g. MIPv6) may be used to obtain the same or similar results as in FIG. 7 in other contemplate embodiments.

Embodiments contemplate one or more groups of GWs that may share a pool of IP addresses. One or more embodiments contemplate that network operators may group the GWs that may be allowed to share IP addresses, perhaps using one or more contemplated transfer mechanisms, for example. In at least one of such scenarios, the GWs may be configured with a group number that may be specified in the IP transfer request. An IP address might not be transferred and/or a tunnel between the two GWs may be used to maintain session continuity, as described herein, for example if perhaps two GWs might not be in the same group, among other scenarios. The GWs may be grouped together, perhaps because they are close (e.g. relatively close) to each other and/or because they may be related (e.g. serving a specific group of users), among other examples.

Embodiments contemplate managing one or more pools of IP addresses on the GWs. One or more embodiments contemplate that the introduction of IP address transfer between the GWs may create in a GW one or more pools of IP addresses that may be empty since one or more, or all, of them may have been transferred to other GWs. Embodiments contemplate one or more techniques to avoid that situation. In some embodiments, one of the GWs may be elected as the master IP address allocator. One or more, or each, GW may request a number of IP addresses to be assigned to them. For example, a GW may request more IP addresses from the master GW, for example when the GW may become short in its IP pool, among other reasons. Alternatively or additionally, a GW which may have a large number of IP addresses in its pool may return some (e.g. which may not be used) to the master GW making them available for another GW, for example. In one or more embodiments, a centralized server may also be used instead of (or in addition to) a master GW to manage the IP addresses pools.

One or more embodiments contemplate that one or more WTRUs may do many HOs especially in a dense network. In such scenarios, among others, an IP address may remain appropriately distributed between the GWs.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A first anchor node in communication with a wireless communication network, the first anchor node comprising:
   a processor, the processor configured at least to:
      send a first message to a second anchor node, wherein the first message indicates a request to transfer an Internet Protocol (IP) address from the second anchor node, and wherein the IP address is used by the second anchor node to communicate with a wirless transmit/receive unit (WTRU);
      receive a second message from the second anchor node, wherein the second message indicates a response that confirms that the second anchor node has transferred the IP address;
      send a third message to a network node, wherein the third message indicates that the IP address transferred from the second anchor node is associated with the first anchor node;
      receive data from the network node to be sent to the WTRU, wherein the data is associated with the transferred IP address; and
      send a fourth message to the WTRU using the transferred IP address if it is determined that the first anchor node and the second anchor node belong to different logical groups, wherein the fourth message includes the data.

2. The first anchor node of claim 1, wherein the processor is further configured to send the fourth message to the WTRU if a geographic distance between the first anchor node and the second anchor node is within a threshold.

3. The first anchor node of claim 1, wherein the processor is further configured to determine that a first data path is shorter than a second data path, wherein the first data path is between the first anchor node and the WTRU, and wherein the second data path between second anchor node and the WTRU.

4. The first anchor node of claim 1, wherein the first anchor node is associated with a first network and the second anchor node is associated with a second network.

5. The first anchor node of claim 1, wherein the processor is further configured to at least one of: detect one or more IP packets directed to the transferred IP address, or forward the one or more IP packets directed to the transferred IP address to the WTRU.

6. The first anchor node of claim 1, wherein the processor is further configured to receive a fifth message from the WTRU using the transferred IP address, wherein the fifth message includes one or more uplink (UL) packets from the WTRU.

7. A method performed by a first anchor node in communication with a wireless communication network, the method comprising:
   sending a first message to a second anchor node, wherein the first message indicates a request to transfer an Internet Protocol (IP) address from a second anchor node, and wherein IP address used by the second anchor node to communicate with a wireless transmit/receive unit (WTRU);
   receiving a second message from the second anchor node, wherein the second message indicates a response that confirms that the second anchor node has transferred the IP address;
   sending a third message to a network node, wherein the third message indicates that the IP address transferred from the second anchor node is associated with the first anchor node;
   receiving data from the network node to be sent to the WTRU, wherein the data is associated with the transferred IP address; and
   sending a fourth message to the WTRU using the transferred IP address if it is determined that the first anchor node and the second anchor node belong to different logical groups, wherein the fourth message includes the data.

8. The method of claim 7, wherein sending the fourth message to the WTRU using the transferred IP address occurs if a geographic distance between the first anchor node and the second anchor node is within a threshold.

9. The method of claim 7, wherein the method further comprises determining that a first data path is shorter than a second data path, wherein the first data path is between the first anchor node and the WTRU, and wherein the second data path is between the second anchor node and the WTRU.

10. The method of claim 7, wherein the first anchor node is associated with a first network and the second anchor node is associated with a second network.

11. The method of claim 7, further comprising at least one of: detecting one or more IP packets directed to the first IP address, or forwarding the one or more IP packets directed to the transferred IP address to the WTRU.

12. The method of claim 7, further comprising receiving a fifth message from the WTRU using the transferred IP address, wherein the fifth message includes one or more uplink (UL) packets from the WTRU.

* * * * *